(12) United States Patent
Krick

(10) Patent No.: US 9,146,869 B2
(45) Date of Patent: Sep. 29, 2015

(54) STATE ENCODING FOR CACHE LINES

(71) Applicant: Advanced Micro Devices, Inc., Sunnyvale, CA (US)

(72) Inventor: Robert Krick, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 244 days.

(21) Appl. No.: 13/706,159

(22) Filed: Dec. 5, 2012

(65) Prior Publication Data
US 2014/0156931 A1    Jun. 5, 2014

(51) Int. Cl.
*G06F 12/00* (2006.01)
*G06F 12/08* (2006.01)
*G06F 13/00* (2006.01)

(52) U.S. Cl.
CPC ................................. *G06F 12/0811* (2013.01)

(58) Field of Classification Search
CPC . G06F 12/08; G06F 12/0802; G06F 12/0804; G06F 12/0806; G06F 12/0808; G06F 12/0811; G06F 12/0815; G06F 12/0897
USPC .................. 711/100, 117, 118, 138, 154, 200
See application file for complete search history.

(56) References Cited

U.S. PATENT DOCUMENTS 5,307,477 A * 4/1994 Taylor et al. ...................... 711/3
5,479,630 A * 12/1995 Killian .............................. 711/3
5,564,035 A * 10/1996 Lai ................................ 711/144
6,976,131 B2 * 12/2005 Pentkovski et al. ........... 711/146

* cited by examiner

*Primary Examiner* — Tuan Thai

(57) ABSTRACT

A method and apparatus for state encoding of cache lines is described. Some embodiments of the method and apparatus support probing, in response to a first probe of a cache line in a first cache, a copy of the cache line in a second cache when the cache line is stale and the cache line is associated with a copy of the cache line stored in the second cache that can bypass notification of the first cache in response to modifying the copy of the cache line.

18 Claims, 5 Drawing Sheets

STATE ENCODING FOR CACHE LINES

BACKGROUND

This application relates generally to processing systems, and, more particularly, to state encoding for cache lines in processing systems.

Many processing devices utilize caches to reduce the average time required to access information stored in a memory. A cache is a smaller and faster memory that stores copies of instructions and/or data that are expected to be used relatively frequently. For example, central processing units (CPUs) are generally associated with a cache or a hierarchy of cache memory elements. Processors other than CPUs, such as, for example, graphics processing units (GPUs), accelerated processing units (APUs), and others are also known to use caches. Instructions or data that are expected to be used by the CPU are moved from (relatively large and slow) main memory into the cache. When the CPU needs to read or write a location in the main memory, it first checks to see whether the desired memory location is included in the cache memory. If this location is included in the cache (a cache hit), then the CPU can perform the read or write operation on the copy in the cache memory location. If this location is not included in the cache (a cache miss), then the CPU needs to access the information stored in the main memory and, in some cases, the information can be copied from the main memory and added to the cache. Proper configuration and operation of the cache can reduce the latency of memory accesses below the latency of the main memory to a value close to the latency of the cache.

A cache can be implemented using different types of caches that can be accessed at different speeds. One widely used architecture for a CPU cache is a hierarchical cache that divides the cache complex into two levels known as the L1 cache and the L2 cache. The L1 cache is typically a smaller and faster memory than the L2 cache, which is smaller and faster than the main memory. The CPU first attempts to locate requested memory locations in the L1 cache and then proceeds to look successively in the L2 cache and the main memory when it is unable to find the memory location in the cache. The L1 cache can be further subdivided into separate L1 caches for storing instructions (L1-I) and data (L1-D). The L1-I cache can be placed (logically or physically) near entities that require more frequent access to instructions than data, whereas the L1-D can be placed closer (logically or physically) to entities that require more frequent access to data than instructions. The L2 cache is typically associated with both the L1-I and L1-D caches and can store copies of instructions or data that are retrieved from the main memory. Frequently used instructions are copied from the L2 cache into the L1-I cache and frequently used data can be copied from the L2 cache into the L1-D cache. The L2 cache is therefore referred to as a unified cache.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Many processing systems implement multiple processor cores and may therefore implement a hierarchical cache complex that includes a higher level cache (such as an L2 cache) that is associated with more than one lower level cache such as an L1 instruction cache and an L1 data cache for each of the processor cores. The L2 cache may be an inclusive cache so that cache lines stored in the L1 caches are also stored in the L2 cache. Thus, there may be more than one copy of each cache line stored in different caches within the hierarchical inclusive cache complex.

Cache coherency protocols may be used to maintain consistency of the data between the caches in the cache complex. However, conventional cache coherency protocols such as the MOESI protocol permit lower level caches in some states to modify (or dirty) cache lines without immediately notifying the higher-level inclusive cache. For example, a processor core may speculatively write data to a cache line during a store operation. However, the speculative store may never be retired and so it may not become necessary to change data in the higher-level cache. Even if the store is retired, the lower-level cache may keep the modified copy of the line without notifying the higher level cache as long as no other agents on the system request the line. The processor core may therefore not notify the higher-level cache of the speculative change in the lower-level cache line until the store has retired or the cache line has been evicted from the lower-level cache. To maintain coherency between the higher and lower level caches, some states require the higher-level cache to back-probe the lower-level cache when the higher-level cache receives a request for the cache line, e.g., via the northbridge in the processing system.

The disclosed subject matter is directed to addressing the effects of one or more of the problems set forth above. In some embodiments, a method is provided for state encoding of cache lines. The method includes probing, in response to a first probe of a cache line in a first cache, a copy of the cache line in a second cache when the cache line is stale and the cache line is associated with a copy of the cache line stored in the second cache that can bypass notification of the first cache in response to modifying the copy of the cache line.

In another embodiment, an apparatus is provided for state encoding of cache lines. The apparatus includes a first cache configurable to probe, in response to a first probe of a cache line in a first cache, a copy of the cache line in a second cache when the cache line is stale and the cache line is associated with a copy of the cache line stored in the second cache that can bypass notification of the first cache in response to modifying the copy of the cache line.

In some embodiments, a computer readable media including instructions is provided that when executed can configure a manufacturing process used to manufacture a semiconductor device for state encoding of cache lines. The manufactured semiconductor device includes a first cache configurable to probe, in response to a first probe of a cache line in a first cache, a copy of the cache line in a second cache when the cache line is stale and the cache line is associated with a copy of the cache line stored in the second cache that can bypass notification of the first cache in response to modifying the copy of the cache line.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
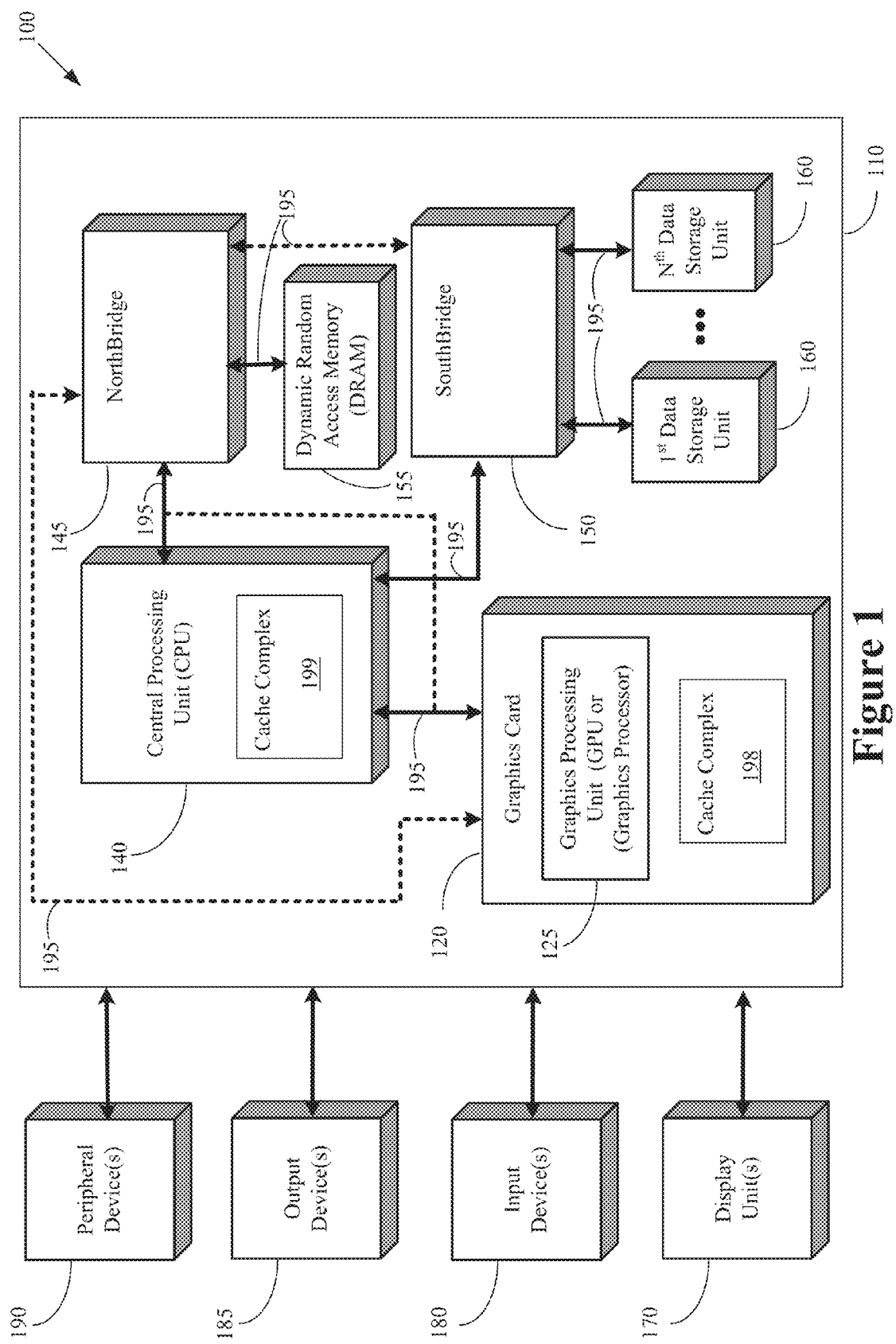
FIG. 1 conceptually illustrates one example of a computer system, according to some embodiments.

While the disclosed subject matter may be modified and may take alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the disclosure with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, conventional cache coherency protocols such as the MOESI protocol permit caches in some states to change (or dirty) cache lines without immediately notifying associated caches that may include copies of the information in the cache line. In some cache line states, maintaining coherency between cache lines in different caches forces one cache to backprobe other caches when the cache receives a request for the cache line. Embodiments of the cache complex as described herein may therefore associate cache lines in one cache, e.g. a higher-level inclusive cache in a cache hierarchy, with information indicating whether the data for the cache line is good or stale. A good cache line is not associated with a copy (modified or unmodified) in another cache, e.g., a lower-level cache, or else the cache line is associated with at least one copy in a cache that cannot be changed without notification. A stale cache line is associated with a copy of the cache line that can be changed by the other cache without notification, regardless of whether the copy of the cache line has been modified or unmodified. The information indicating whether the cache line is good or stale (possibly in combination with other information) may be used to determine whether to probe other caches in response to a probe from another agent in the system, e.g., a downgrade probe from the northbridge or a request from another cache in the same cache complex. For example, if a copy of the requested line is present in a lower-level cache and the cache line is in the good state, the higher-level inclusive cache "knows" that the cache line in the higher level cache can be used to satisfy the request. However, a stale cache line may have been modified by the lower-level cache and so the higher level cache should probe the lower level cache that includes the copy before satisfying the request. As used herein, the term "probe" refers to probes, back probes, cache line access requests, and other actions that access the contents of a cache line. Persons of ordinary skill in the art having benefit of the present disclosure should appreciate that probing may also be referred to as sniffing or snooping.

FIG. 1 conceptually illustrates one example of a computer system 100, according to some embodiments. In various embodiments, the computer system 100 may be a personal computer, a laptop computer, a handheld computer, a netbook computer, a mobile device, a tablet computer, a netbook, an ultrabook, a telephone, a personal data assistant (PDA), a server, a mainframe, a work terminal, a smart television, or the like. The computer system includes a main structure 110 which may be a computer motherboard, system-on-a-chip, circuit board or printed circuit board, a desktop computer enclosure or tower, a laptop computer base, a server enclosure, part of a mobile device, tablet, personal data assistant (PDA), or the like. In some embodiments, the computer system 100 runs an operating system such as Linux, Unix, Windows, Mac OS, or the like.

In some embodiments, the main structure 110 includes a graphics card 120. For example, the graphics card 120 may be an ATI Radeon™ graphics card from Advanced Micro Devices ("AMD"). The graphics card 120 may, in different embodiments, be connected on a Peripheral Component Interconnect (PCI) Bus (not shown), PCI-Express Bus (not shown), an Accelerated Graphics Port (AGP) Bus (also not shown), or other electronic or communicative connection. In some embodiments, the graphics card 120 may contain a graphics processing unit (GPU) 125 used in processing graphics data. In various embodiments the graphics card 120 may be referred to as a circuit board or a printed circuit board or a daughter card or the like.

The computer system 100 shown in FIG. 1 also includes a central processing unit (CPU) 140, which is electronically or communicatively coupled to a northbridge 145. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other electronic or communicative connection. For example, CPU 140, northbridge 145, GPU 125 may be included in a single package or as part of a single die or "chip". In certain embodiments, the northbridge 145 may be coupled to a system RAM (or DRAM) 155 and in other embodiments the system RAM 155 may be coupled directly to the CPU 140. The system RAM 155 may be of any RAM type known in the art; the type of RAM 155 may be a matter of design choice. In some embodiments, the northbridge 145 may be connected to a southbridge 150. In other embodiments, the northbridge 145 and southbridge 150 may be on the same chip in the computer system 100, or the northbridge 145 and southbridge 150 may be on different chips. In various embodiments, the southbridge 150 may be connected to one or more data storage units 160. The data storage units 160 may be hard drives, solid state drives, magnetic tape, or any other writable media used for storing data. In various embodiments, the central processing unit 140, northbridge 145, southbridge 150, graphics processing unit 125, or DRAM 155 may be a computer chip or a silicon-based computer chip, or may be part of a computer chip or a silicon-based computer chip. DRAM may be all or partially stacked memory. DRAM is used as a high level cache in some embodiments. In one or more embodiments, the various components of the computer system 100 may be operatively, electrically or physically connected or linked with a bus 195 or more than one bus 195.

The computer system 100 may be connected to one or more display units 170, input devices 180, output devices 185, or peripheral devices 190. For example, the display unit 170 may be connected to the graphics card 120. The I/O devices 180, 185 and the peripheral devices 190 may be connected to the southbridge 150. In some embodiments, these elements may be internal or external to the computer system 100, and may be wired or wirelessly connected. The display units 170 may be internal or external monitors, television screens, handheld device displays, touchscreens, and the like. The input devices 180 may be any one of a keyboard, mouse, track-ball, stylus, mouse pad, mouse button, joystick, touchscreen, scanner or the like. The output devices 185 may be any one of a monitor, printer, plotter, copier, or other output device. The peripheral devices 190 may be any other device that can be coupled to a computer. Exemplary peripheral devices 190 may include a CD/DVD drive capable of reading or writing to physical digital media, a USB device, Zip Drive, external floppy drive, external hard drive, phone or broadband modem, router/gateway, access point or the like.

The GPU 120 and the CPU 140 may be associated with cache complexes 198, 199, respectively. In some embodiments, the cache complexes 198, 199 are hierarchical cache complexes that include a hierarchy of caches. For example, the cache complexes 198, 199 may include an inclusive L2 cache (not shown in FIG. 1) that is associated with one or more L1 instruction or data caches (not shown in FIG. 1). Cache complexes 198, 199 are not limited to physical boundaries of CPU 140 and GPU 125. For example, a high level L3 cache may be a separate standalone memory not onboard the chip while corresponding L1 or L2 caches in the cache complexes 198, 199 may be implemented onboard the chip. In some embodiments DRAM or a portion DRAM is included in the hierarchy of caches. The cache complexes 198, 199 may read or write information to or from memory elements such as the DRAM 155 or the data storage units 160. The cache complexes 198, 199 may also receive or respond to probes from other elements in the system 100 including the northbridge 145, the southbridge 150, or other elements.

Figure 2:
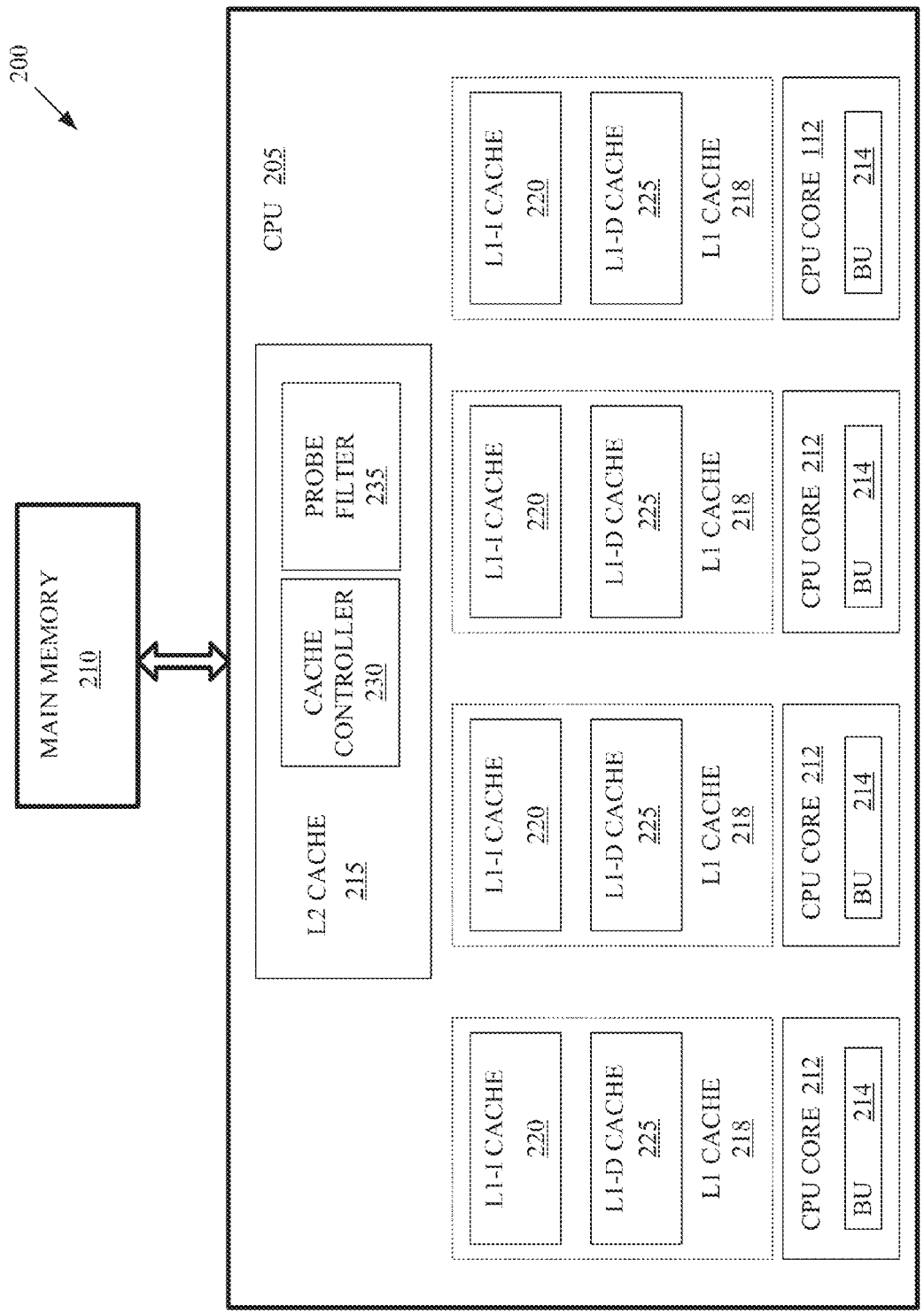
FIG. 2 conceptually illustrates an example of a semiconductor device that may be formed in or on a semiconductor wafer (or die), according to some embodiments.

FIG. 2 conceptually illustrates an example of a semiconductor device 200 that may be formed in or on a semiconductor wafer (or die), according to some embodiments. The semiconductor device 200 may be formed in or on the semiconductor wafer using well known processes such as deposition, growth, photolithography, etching, planarising, polishing, annealing, and the like. In some embodiments, the device 200 includes a central processing unit (CPU) 205 that is configured to access instructions or data that are stored in the main memory 210, e.g., via the northbridge 145 as shown in FIG. 1. Although a single CPU 205 is depicted in FIG. 2, some embodiments of the semiconductor device 200 may include multiple instances of the CPU 205 and each instance may have a connection to the northbridge. In these embodiments, the L2 cache 215 for each instance of the CPU 205 is inclusive for the underlying L1 caches 218 in that instance of the CPU 205. The northbridge is responsible for maintaining cache coherency between the different instances of the CPU 205. For example, the northbridge may be responsible for insuring that only one instance of the CPU 205 has a line in the Exclusive (E) or Modified (M) state. In some embodiments, the CPU 205 includes four CPU cores 212 that may be used to execute instructions or manipulate data. Embodiments of the CPU 205 may be implemented in embodiments of the computer system 100 shown in FIG. 1. Persons of ordinary skill in the art having benefit of the present disclosure should also appreciate that in some embodiments, the semiconductor device 200 may include other processing devices such as GPUs, APUs, and the like.

The processor cores 212 may include a bus unit (BU) 214 for managing communication over bridges or buses in the processing system 200. For example, the bus unit 214 may be used as an interface to the bus 195 shown in FIG. 1. Some embodiments of the CPU 205 also implements a hierarchical (or multilevel) cache system that is used to speed access to the instructions or data by storing selected instructions or data in the caches. However, persons of ordinary skill in the art having benefit of the present disclosure should appreciate that some embodiments of the device 200 may implement different configurations of the CPU 205, such as configurations that use external caches, different types of processors (e.g., GPUs or APUs), or different numbers of processor cores 212.

The illustrated cache system includes a level 2 (L2) cache 215 for storing copies of instructions or data that are stored in the main memory 210. In some embodiments, the L2 cache 215 is 4-way associative to the main memory 210 so that each line in the main memory 210 can potentially be copied to and from 4 particular lines (which are conventionally referred to as "ways") in the L2 cache 215. However, persons of ordinary skill in the art having benefit of the present disclosure should appreciate that some embodiments of the main memory 210 and/or the L2 cache 215 can be implemented using any associativity including 2-way associativity, 8-way associativity, 16-way associativity, direct mapping, fully associative caches, and the like. Relative to the main memory 210, the L2 cache 215 may be implemented using smaller and faster memory elements. The L2 cache 215 may also be deployed logically or physically closer to the CPU core 212 (relative to the main memory 210) so that information may be exchanged between the CPU core 212 and the L2 cache 215 more rapidly and/or with less latency.

The illustrated cache system also includes L1 caches 218 for storing copies of instructions or data that are stored in the main memory 210 and/or the L2 cache 215. Each L1 cache 218 is associated with a corresponding processor core 212. In some embodiments, the L1 cache 218 may be implemented in the corresponding processor core 212. Alternatively, the L1 cache 218 may be implemented outside the corresponding processor core 212 and may be physically, electrically, or communicatively coupled to the corresponding processor core 212. Relative to the L2 cache 215, the L1 cache 218 may be implemented using smaller and faster memory elements so that information stored in the lines of the L1 cache 218 can be retrieved quickly by the corresponding processor core 212. The L1 cache 218 may also be deployed logically or physically closer to the CPU core 212 (relative to the main memory 210 or the L2 cache 215) so that information may be exchanged between the CPU core 212 and the L1 cache 218 more rapidly or with less latency (relative to communication with the main memory 210 and the L2 cache 215).

In some embodiments, the L1 caches 218 are separated into level 1 (L1) caches for storing instructions and data, which are referred to as the L1-I cache 220 and the L1-D cache 225. Separating or partitioning the L1 cache 218 into an L1-I cache 220 for storing instructions and an L1-D cache 225 for storing data may allow these caches to be deployed closer to the entities that are likely to request instructions and/or data, respectively. Consequently, this arrangement may reduce contention, wire delays, and generally decrease latency associated with instructions and data. In some embodiments, a replacement policy dictates that the lines in the L1-I cache 220 are replaced with instructions from the L2 cache 215 and the lines in the L1-D cache 225 are replaced with data from the L2 cache 215. However, persons of ordinary skill in the art should appreciate that in some embodiments the L1 caches 218 may be partitioned into different numbers or types of caches. Furthermore, persons of ordinary skill in the art should appreciate that some programming or configuration techniques may allow the L1-I cache 220 to store data or the L1-D cache 225 to store instructions, at least on a temporary basis.

The L2 cache 215 and one or more of the L1 caches 218, 220, 225 may store copies of the same information in their cache lines. In some embodiments, the L2 cache 215 is inclusive so that cache lines resident in the L1 caches 218, 220, 225 are also resident in the L2 cache 215. Persons of ordinary skill in the art having benefit of the present disclosure should appreciate that the L1 caches 218 and the L2 cache 215 represent one example of a multi-level hierarchical cache memory system, according to some embodiments. Some embodiments may use different multilevel caches including elements such as L0 caches, L1 caches, L2 caches, L3 caches, and the like.

In operation, because of the low latency, a core 212 first checks its corresponding L1 caches 218, 220, 225 when it needs to retrieve or access an instruction or data. If the request to the L1 caches 218, 220, 225 misses, then the request may be directed to the L2 cache 215, which can be formed of a relatively larger and slower memory element than the L1 caches 218, 220, 225. Alternatively, the core 212 may start an L2 lookup before an L1 hit/miss is determined. In the case of an L1 hit, the L2 access would then be cancelled. The main memory 210 is formed of memory elements that are larger and slower than the L2 cache 215 and so the main memory 210 may be the object of a request in response to cache misses from both the L1 caches 218, 220, 225 and the L2 cache 215. The L2 cache 215 may also receive external probes, e.g. via a bridge or a bus, for lines that may be resident in one or more of the corresponding L1 caches 218, 220, 225.

L2 cache 215 can be configured to determine whether its cache lines are "good" or "stale" in response to a probe from another agent in the system, e.g., a downgrade probe from the northbridge or a request from another cache in the same cache complex such as the L1 caches 218, 220, 225 associated with the cores. As used herein, the term "good" is understood to mean that the data stored in the cache line is current or up to date. For example, a good cache line may be a cache line that is not associated with a copy in another cache (such as the L1 caches 218, 220, 225) or is associated with at least one copy in a cache (such as the L1 caches 218, 220, 225) that cannot be changed without notifying the L2 cache 215, e.g. the L1 caches can bypass notifying the L2 cache 215 after modifying the data. As used herein, the term "stale" indicates that it is uncertain whether the data stored in the cache line is current. For example, a stale cache line may be a cache line that is associated with a copy of the cache line in another cache (such as the L1 caches 218) that can be changed without notifying the L2 cache 215. If a copy of the requested line is present in one of the L1 caches 218, 220, 225 and the cache line is in the good state, the L2 cache 215 "knows" that its copy of the cache line can be used to satisfy the request. However, a stale cache line may have been modified by the L1 cache 218, 220, 225 and so the L2 cache 215 should probe the L1 cache 218, 220, 225 that includes the copy before the L2 cache 215 satisfies the request. In some embodiments, bits associated with the cache line in the L2 cache 215 may be used to indicate the state of the cache line or the number of caches that include copies of the cache line.

A cache controller 230 may be implemented in the CPU 205 to perform operations that may include setting or clearing state encoding bits that are used to indicate the state of the cache line or valid bits that are used to indicate how many caches include copies of the cache line, as discussed herein. In some embodiments, the cache controller 230 is implemented in hardware as part of the L2 cache 215. However, persons of ordinary skill in the art having benefit of the present disclosure should appreciate that in some embodiments portions of the cache controller 230 may be implemented in hardware, firmware, software, or any combination thereof. Moreover, the cache controller 230 may be implemented in other locations internal or external to the CPU 205.

Figure 3:
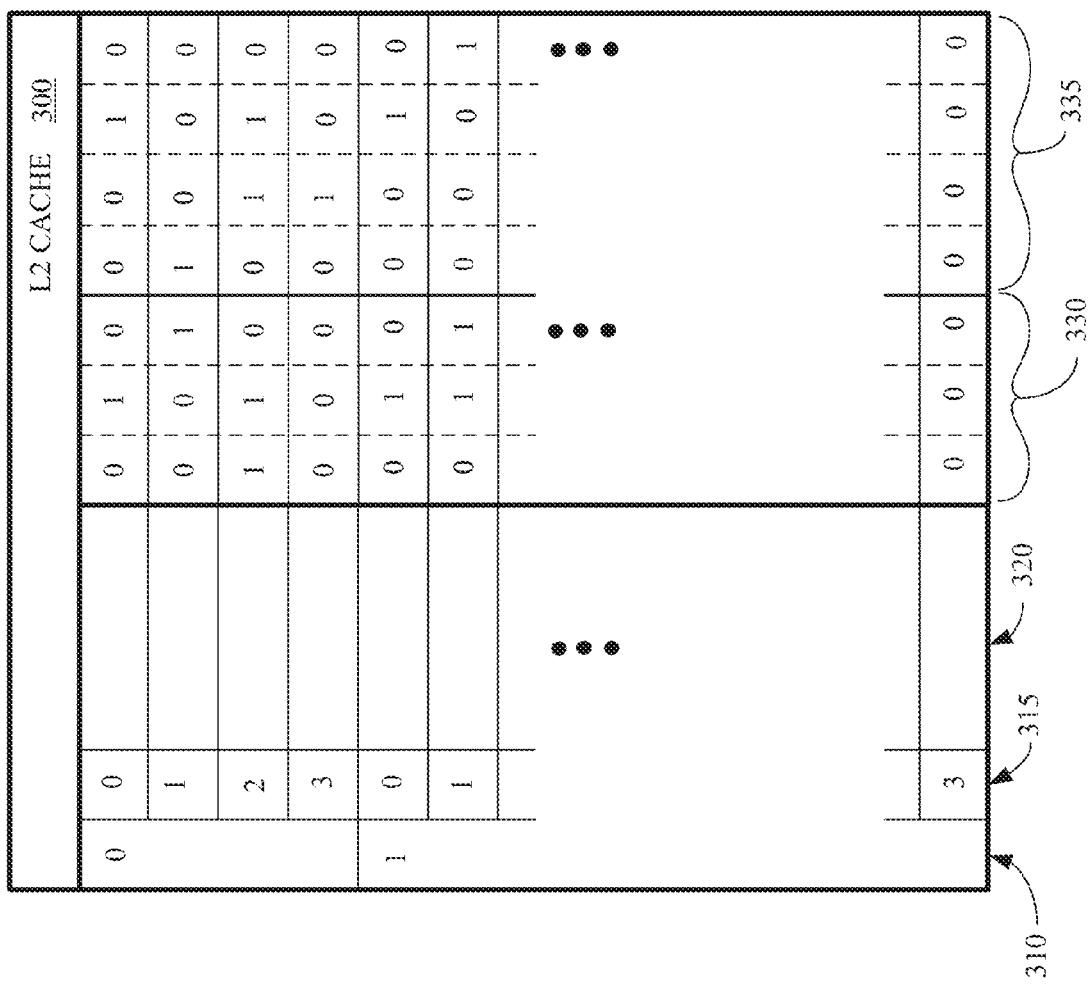
FIG. 3 conceptually illustrates examples of an L2 cache and associated processor cores, according to some embodiments.
Figure 3:
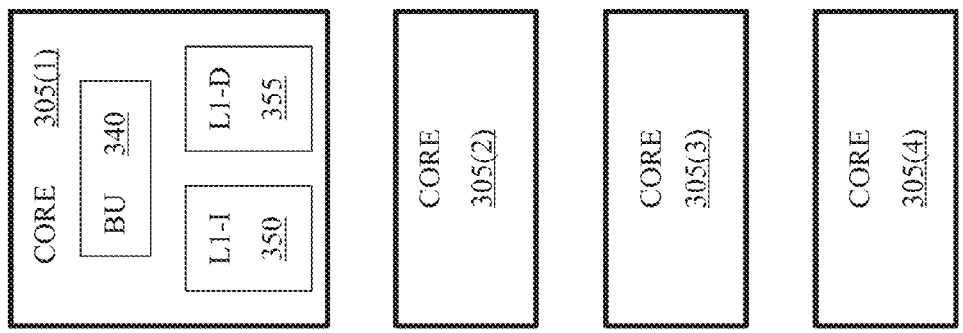

FIG. 3 conceptually illustrates examples of an L2 cache 300 and associated processor cores 305, according to some embodiments. In some embodiments, the L2 cache 300 is 4-way associative. The indexes are indicated in column 310 and the ways in the L2 cache 300 are indicated by the numerals 0-3 in the column 315. The column 320 indicates the associated cache lines, which may include information or data. In some embodiments, the L2 cache 300 is inclusive of lines that may be associated with instruction (L1-I) and data (L1-D) caches 350, 355 in the processor cores 305. In some embodiments, the instruction (L1-I) and data (L1-D) caches 350, 355 may be implemented external to the processor cores 305 and physically, electrically, or communicatively coupled to the processor cores 305.

Each line in the L2 cache 300 is associated with a set of state encoding bits 330. The state encoding bits 330 for each line may be used to indicate the state of the corresponding cache line, which may include indicating whether the cache line is good or stale. In some embodiments, three state encoding bits 330 are associated with each line and may be used to indicate eight different states for the corresponding cache line. Reducing the number of cache line states to eight or fewer allows the states to be indicated using three or fewer state encoding bits 330. At least in part because of the large number of lines in embodiments of the L2 cache 300, decreasing the number of state encoding bits may significantly reduce the area consumed by the L2 cache 300 on a chip or substrate. For example, the area required for approximately 32,000 bits may be saved when the number of state encoding bits 330 is reduced from four to three in a cache that includes 32K lines.

Lines in the L2 cache 300 may also be associated with a set of valid bits 335. The valid bits 335 may indicate which of the cores 305 include copies of the corresponding line in the L2 cache 300. In some embodiments, four valid bits 335 are defined to correspond to the four cores 305. A set value of "1" in a valid bit 335 indicates that the corresponding core 305 includes a valid copy of the line in the L2 cache 300. An unset value of "0" in a valid bit 335 indicates that the corresponding core 305 does not include a valid copy of the lines in the L2 cache 300. Persons of ordinary skill in the art having benefit of the present disclosure should appreciate that alternative bit configurations may be used to indicate the number of cores 305 that include copies of the corresponding line in the L2 cache 300.

Values of the state encoding bits 330 or the valid bits 335 may be set or modified to reflect changes in the state of the cache lines. For example, a state machine may be used to set or modify values of the state encoding bits 330.

Figure 4:
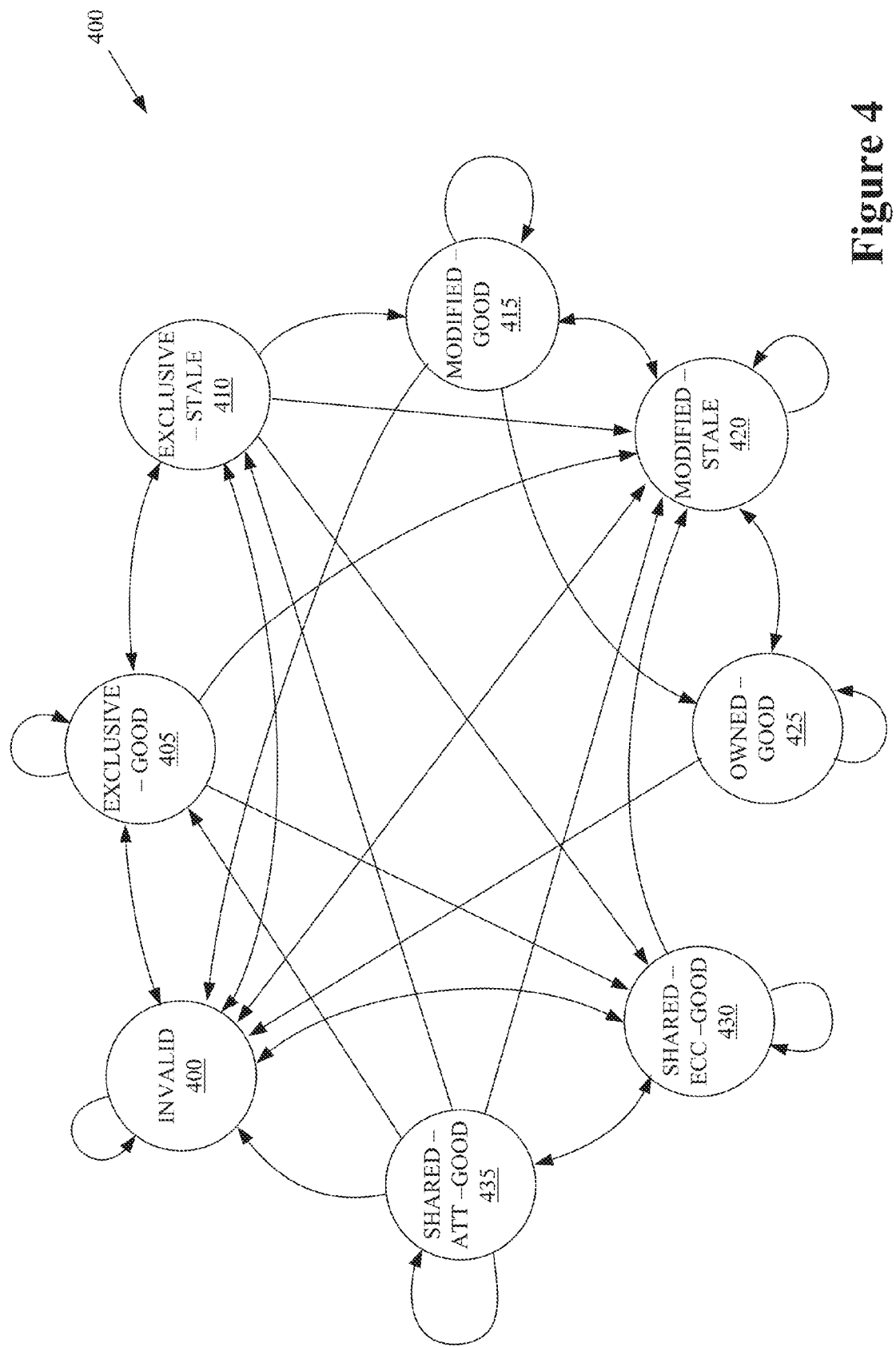
FIG. 4 conceptually illustrates one example of a state machine that may be used to set or modify values of state encoding bits or valid bits in a cache, according to some embodiments.

FIG. 4 conceptually illustrates one example of a state machine 400 that may be used to set or modify values of state encoding bits or valid bits in a cache, according to some embodiments. In some embodiments, the state machine 400 includes eight states: invalid 400, exclusive/good 405, exclusive/stale 410, modified/good 415 modified/stale 420, owned/good 425, shared/ECC/good 430, and shared/ATT/good 435. A cache line in the invalid state 400 does not hold a valid copy of the data. A cache line in the exclusive/good state 405 holds the most recent, correct copy of the data and the copy in main memory is also the most recent, correct copy of the data. A cache line in the exclusive/stale state 410 holds data that may or may not be the most recent, correct copy of the data because one other processor core has a copy of the cache line, which may have been modified by the processor core without notifying the cache. A cache line in the modified/good state 415 holds the most recent, correct copy of the data. A cache line in the modified/stale state 420 holds data that may or may not be the most recent, correct copy of the data because one other processor core has a copy of the cache line, which may have been modified by the processor core without notifying the cache.

A cache line in the shared/good states 430, 435 holds the most recent, correct copy of the data and other processors in the system may hold copies of the data in the shared states 430, 435. As discussed herein, in embodiments that include multiple instances of a CPU or other processing device, cache coherence between the instances may be maintained by the northbridge. For example, the northbridge may be responsible for insuring that only one instance of the CPU holds a line in the Exclusive (E) or Modified (M) state in its L2 cache. Lines that are stored in the cache may be protected using error correcting code (ECC) and these lines may be in the shared-ECC state 430. For example, an underlying L1 data cache may not be able to tolerate a parity error from a higher level L2 cache and so the ECC is used to maintain error-free lines, as well as to detect or correct internal data corruption. Branch prediction state information (which may also be referred to as attributes ATT of the line) may be stored with a cache line, which may then be in the shared-ATT state 435. Storing attributes with the cache line may reduce or eliminate the warm-up time to reestablish the branch prediction state for the line, which may save processing cycles.

A cache line in the owned/good state 425 holds the most recent, correct copy of the data. The owned state is similar to the shared state in that other processors can hold a copy of the most recent, correct data. The copy in main memory can be stale (incorrect) and the owner "owns" the responsibility of eventually writing the modifications back to main memory. If the cache holds the data in the owned/good state 425, one of the processor cores may hold the line in the owned state and other processor cores that have the line must hold the data in one of the shared states 430, 435. In some embodiments, an L2 cache line that is a modified state 415, 420 may receive a downgrade probe so that the value in the L2 cache line is stale but the line in the underlying L1 cache is good. The L2 cache line may then be updated using a probe (e.g., a backprobe) of an underlying L1 cache. The L2 cache line should eventually be placed in the owned/good state 425 following the downgrade probe and the backprobe of the L1 cache. However, the L2 cache line may briefly be in a stale state while it waits for the updated information from the L1 cache. Incorporating a guard window that includes a time interval between receiving the downgrade probe and updating the value of the L2 cache line using the backprobe can remove the need for an owned/stale state and allow the L2 cache line to transition directly to the owned/good state 425 following the guard window, thereby reducing the total number of states used to represent states of the L2 cache line.

Some embodiments of state machines may include a "fill pending" state. The L2 cache line may be placed in the fill pending state when the L2 cache receives a request that misses the cache line. The fill pending state indicates that data for the cache line is on the way. Alternatively, the fill pending state may be removed by preventing access to the index/way that holds the cache line while the miss is outstanding. Once the cache line has been updated in response to the miss, probes or accesses may be permitted again. In some embodiments, the state machine may include or have access to a data structure that stores the indexes/ways for the outstanding misses. The state machine may use the information in the data structure to determine whether to permit accesses or probes of the cache lines. Eliminating the fill pending state in this way reduces the total number of states used to represent states of the L2 cache line.

The arrows in FIG. 4 illustrate the possible transitions between the different states of the state machine 400. In some embodiments, transitions occur in response to events that may include probes, snoops, requests, cache hits, cache misses, and the like. Table 1 shows one illustrative portion of an exemplary coherence table that may be used to determine transitions between the states of the state machine 400. In some embodiments, the state machine 400 is used to determine states of an inclusive L2 cache and a cache complex that includes a plurality of processor cores that implement L1 data and instruction caches. The first column indicates the initial state of a line the L2 cache (invalid in this case), the second column indicates whether the state is good or stale (stale, in this case) and the third column indicates the number of processor cores that include copies of the cache line (0, in this case). The fourth column indicates the command and the fifth column indicates the action sequence initiated by the command. The sixth column indicates the final state of the line after the action sequence, the seventh column indicates whether the final state is stale, and the eighth column indicates the number of processor cores that include copies of the cache line following the action sequence.

TABLE 1

| I | stale | 0 | RDBLKS | CCI => RspS => L2 RspS | S-ecc | good | 1 |
|---|---|---|---|---|---|---|---|
| | | | RDBLK | CCI => RspS => L2 RspS | S-ecc | good | 1 |
| | | | RDBLK | CCI => RspE => L2 RspE | E | stale | 1 |
| | | | RDBLKM | CCI => RspM => L2 RspM | M | stale | 1 |

The command RDBLKS is a speculative or shared read of a cache line over a cache coherent interface (CCI). The actions taken in response to the RDBLKS include sending a response (RspS) that places the L2 cache line in the shared state (S-ecc), which uses error correcting codes in some embodiments. The cache line in the L2 cache is in the "good" state and one processor core includes a copy of the cache line. This command/action therefore corresponds to a transition from the invalid state 400 to the shared-ECC-good state 430 shown in FIG. 4. The command RDBLK is a read of a cache line over the CCI. The actions taken in response to the RDBLK may include sending a response (RspS) that places the L2 cache line in the good shared state (S-ecc) or a response (RspE) that places the L2 cache line in the stale exclusive state (E). One processor core includes a copy of the cache line and the processor core can modify the cache line in the exclusive-stale state without notifying the L2 cache. These commands/actions therefore correspond to a transition from the invalid state 400 to either the shared-ECC-good state 430 or the exclusive-stale state 410 shown in FIG. 4. The command RDBLKM is a read of a cache line over the CCI. The actions taken in response to the RDBLKM include sending a response (RspM) that places the L2 cache line in the stale modified state (M). One processor core includes a copy of the cache line and the processor core can modify the cache line in the modified-stale state without notifying the L2 cache. This command/action therefore corresponds to a transition from the invalid state 400 to the modified-stale state 420 shown in FIG. 4.

Persons of ordinary skill in the art having benefit of the present disclosure should appreciate that the coherency tables and the states shown in FIG. 4 are intended to be illustrative. Some embodiments may use different sets of states or different coherency tables to define the transitions between the states for different sets of commands/actions.

Figure 5:
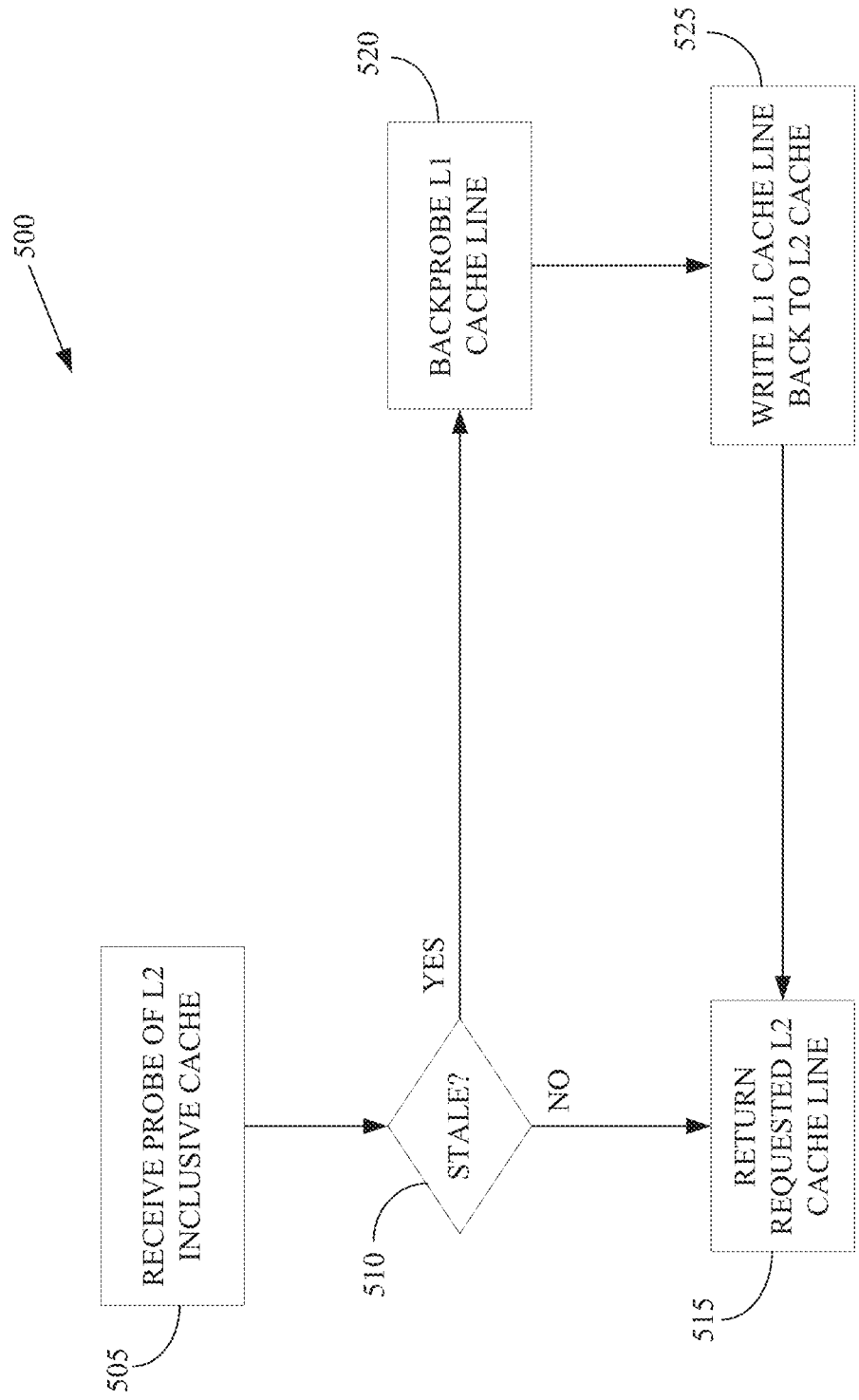
FIG. 5 conceptually illustrates one example of a method for encoding states of cache lines, according to some embodiments.

FIG. 5 conceptually illustrates one example of a method 500 for encoding states of cache lines. In some embodiments, a probe of a line in a cache such as an inclusive L2 cache is received (at 505). The L2 cache then determines (at 510) whether the probed cache line is good or stale, as discussed herein. The L2 cache may satisfy the probe request and return (at 515) the information in the requested cache line without performing any additional back probing of underlying caches if the L2 cache determines (at 510) that the probed cache line is good. If the L2 cache determines (at 510) that the probed cache line is stale and an underlying cache such as an L1 cache may have modified or dirtied the cache line without notifying the L2 cache, then the L2 cache may backprobe (at 520) the L1 cache line. The L1 cache may then write (at 525) the probed L1 cache line back to the L2 cache and invalidate its copy of the cache line. Once the L1 cache line has been written back to the L2 cache, the L2 cache may satisfy the probe request and return (at 515) the information in the requested cache line in response to the probe.

Embodiments of processor systems that can encode states of cache lines as described herein (such as the processor system 100) can be fabricated in semiconductor fabrication facilities according to various processor designs. In some embodiments, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarising, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   in response to a first probe of a cache line in a first cache, probing a copy of the cache line in a second cache when the cache line is stale and the cache line is associated with a copy of the cache line stored in the second cache that can bypass notification of the first cache in response to modifying the copy of the cache line; and
   implementing a guard window that includes a time interval between receiving a downgrade probe and updating a value of the cache line in the first cache so that the cache line bypasses a stale state and transitions to a good state following the guard window.

2. The method of claim 1, wherein the first cache is a higher level cache in a cache hierarchy that includes a plurality of lower level caches, and wherein the first cache is inclusive of the plurality of lower level caches, and wherein the plurality of lower level caches comprises the second cache.

3. The method of claim 1, comprising determining whether the cache line is stale based on a plurality of bits associated with the cache line.

4. The method of claim 3, comprising setting values of the plurality of bits to indicate that the cache line is in one of a plurality of states that indicate whether the cache line is stale.

5. The method of claim 4, wherein the plurality of states includes no more than eight states and the plurality of bits includes no more than three bits to represent the eight states.

6. The method of claim 1, comprising receiving the first probe, determining that the cache line is stale, probing the second cache, receiving information stored in the copy of the cache line in the second cache, and responding to the first probe based on the received information.

7. The method of claim 1, determining that the cache line is good because the cache line is not associated with a copy of the cache line in a second cache that can bypass notification of the first cache in response to modifying the copy of the cache line.

8. The method of claim 7, comprising receiving the first probe, determining that the cache line is good, and responding to the first probe based on information stored in the cache line without probing the second cache in response to the first probe.

9. An apparatus, comprising:
   a first cache configurable to probe, in response to a first probe of a cache line in a first cache, a copy of the cache line in a second cache when the cache line is stale and the cache line is associated with a copy of the cache line stored in the second cache that can bypass notification of the first cache in response to modifying the copy of the cache line; and
   the apparatus implementing a guard window that includes a time interval between receiving a downgrade probe and updating a value of the cache line in the first cache so that the cache line bypasses a stale state and transitions to a good state following the guard window.

10. The apparatus of claim 9, comprising a plurality of lower level caches in a cache hierarchy that comprises the first cache and the second cache, and wherein the first cache is a higher level cache that is inclusive of the plurality of lower level caches.

11. The apparatus of claim 9, comprising a plurality of state encoding bits associated with the cache line, and wherein the first cache is configurable to determine whether the cache line is stale based on the plurality of state encoding bits.

12. The apparatus of claim 11, wherein the first cache is configurable to set values of the plurality of state encoding bits to indicate that the cache line is in one of a plurality of states that indicate whether the cache line is stale.

13. The apparatus of claim 12, wherein the plurality of states includes no more than eight states and the plurality of state encoding bits includes no more than three bits to represent the eight states.

14. The apparatus of claim 9, wherein the first cache is configurable to receive the first probe, determine that the cache line is stale, probe the second cache, receive information stored in the copy of the cache line in the second cache, and respond to the first probe based on the received information.

15. The apparatus of claim 9, wherein the first cache is configurable to determine that the cache line is good because the cache line is not associated with a copy of the cache line in a second cache that can bypass notification of the first cache in response to modifying the copy of the cache line.

16. The apparatus of claim 15, wherein the first cache is configurable to receive the first probe, determine that the cache line is good, and respond to the first probe based on information stored in the cache line without probing the second cache in response to the first probe.

17. A non-transitory computer readable medium including instructions that when executed can configure a manufacturing process used to manufacture a semiconductor device comprising:
    a first cache configurable to probe, in response to a first probe of a cache line in a first cache, a copy of the cache line in a second cache when the cache line is stale and the cache line is associated with a copy of the cache line stored in the second cache that can bypass notification of the first cache in response to modifying the copy of the cache line; and
    the semiconductor device implementing a guard window that includes a time interval between receiving a downgrade probe and updating a value of the cache line in the first cache so that the cache line bypasses a stale state and transitions to a good state following the guard window.

18. The non-transitory computer readable medium set forth in claim 17, further comprising instructions that when executed can configure the manufacturing process used to manufacture the semiconductor device comprising a plurality of lower level caches in a cache hierarchy that comprises the first cache and the second cache, and wherein the first cache is a higher level cache that is inclusive of the plurality of lower level caches.

* * * * *